(No Model.)

E. McPHEE.
TWO WHEELED VEHICLE.

No. 491,125. Patented Feb. 7, 1893.

Witnesses.
A. Ruppert,
G. B. Towles

Inventor.
Eugene McPhee
Per
Thomas P. Simpson
Atty

UNITED STATES PATENT OFFICE.

EUGENE McPHEE, OF LEAD CITY, SOUTH DAKOTA.

TWO-WHEELED VEHICLE.

SPECIFICATION forming part of Letters Patent No. 491,125, dated February 7, 1893.

Application filed May 16, 1892. Serial No. 433,116. (No model.)

*To all whom it may concern:*

Be it known that I, EUGENE McPHEE, a citizen of the United States, residing at Lead City, in the county of Lawrence and State of South Dakota, have invented certain new and useful Improvements in Two-Wheeled Vehicles; and I do hereby declare the following to be a full, clear, and exact description of the invention, such as will enable others skilled in the art to which it appertains to make and use the same.

The invention relates to road carts, sulkies or other two-wheeled vehicles and consists in the improvements hereinafter described and pointed out in the claims.

Figure 1:
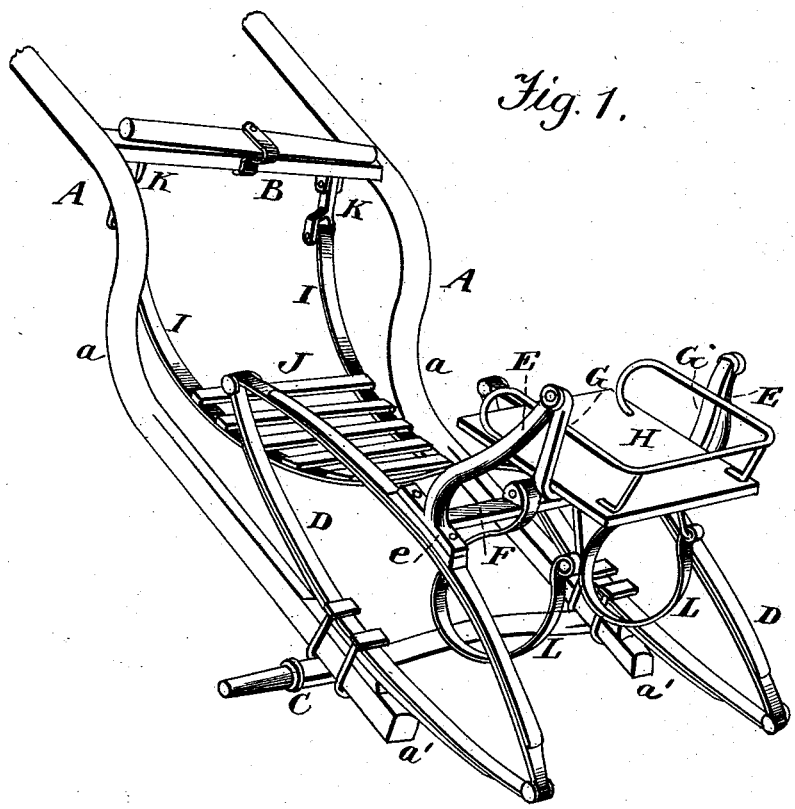
Figure 2:
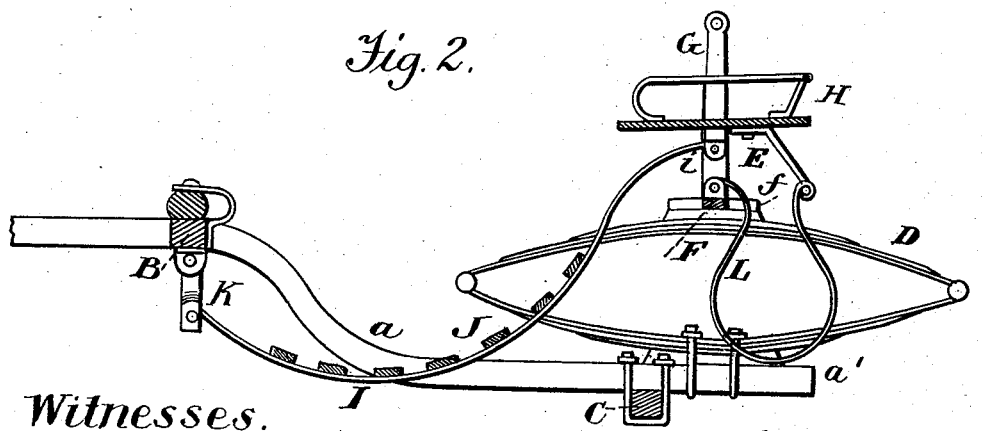

Figure 1 of the drawings is a perspective view, and Fig. 2 a longitudinal median vertical section.

In the drawings, A A represent the thills connected by the whiffletree cross-bar B and, after passing back a short distance, provided with the rearwardly extending incline $a$, then projecting in a horizontal line to and on the axle C to which they are clipped. The thills have an extension $a'$ a little beyond the axle and on this is fastened by clips, or in any preferred way, the middle of the bottom half of an elliptic spring D, while the middle of the upper half supports the T-heads $e\ f$ of the uprights E and horizontal cross-bar F. In the upper ends of the uprights E E is journaled the ends of a crank shaft G in whose bottom is secured the seat H which is thus enabled to swing between the uprights E E, so that the occupant will always be kept in his true position by gravity.

The rods I I, which form the sides to the footrest J, are connected loosely at $i$ beneath the seat and in front are connected to the bottom of the whiffletree crossbar by the double-jointed bar K so as to allow the seat and footrest to swing together.

The seat H is steadied in position by the curved springs L L which are attached at one end to the rod or crossbar F and at the other to the bottom of the seat.—Thus it will be perceived that the swinging seat H hangs eight or ten inches below the bearings of the crank shaft G and will receive none of the rough jars from the horse-motion; also will be held always level by the weight of the occupant. If the horse makes a sudden start, the seat and not the man will be thrown backward. Hence there is no danger of being thrown backward.

I am aware that it is not new to make carts with swinging bodies while I believe myself to be the first to make a cart in which the seat swings on the body.

Having thus described my invention what I claim as new and desire to protect by Letters Patent is:

1. The combination with thills and elliptic springs, of the T-head uprights E, and the cross-bar F connecting the tops of said springs, the crank-shaft G journaled in the upper ends of said uprights and the seat H arranged as shown on the crank shaft as and for the purpose set forth.

2. The combination with the seat H and thill crossbar B, of the footrest J provided with side-rods I I loosely connected with the bottom of seat and with the said crossbar by a double jointed bar K as shown and described.

In testimony whereof I affix my signature in presence of two witnesses.

EUGENE McPHEE.

Witnesses:
WM. LONG,
JOHN ABT.